United States Patent
Nishikori et al.

(10) Patent No.: US 6,764,154 B2
(45) Date of Patent: Jul. 20, 2004

(54) INK-JET PRINTING APPARATUS AND INK-JET PRINTING METHOD

(75) Inventors: Hitoshi Nishikori, Tokyo (JP); Naoji Otsuka, Kanagawa (JP); Hitoshi Sugimoto, Kanagawa (JP); Kiichiro Takahashi, Kanagawa (JP); Osamu Iwasaki, Tokyo (JP); Minoru Teshigawara, Kanagawa (JP); Takeshi Yazawa, Kanagawa (JP); Toshiyuki Chikuma, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/062,449

(22) Filed: Feb. 5, 2002

(65) Prior Publication Data

US 2002/0113758 A1 Aug. 22, 2002

(30) Foreign Application Priority Data

Feb. 6, 2001 (JP) .................................. 2001/030186

(51) Int. Cl.$^7$ .............................. B41J 29/38; B41J 2/15
(52) U.S. Cl. .............................. 347/12; 347/41; 347/37
(58) Field of Search ............................. 347/43, 15, 41, 347/40, 12, 16, 37, 14

(56) References Cited

U.S. PATENT DOCUMENTS 6,086,185 A    7/2000  Inui et al.
6,089,697 A    7/2000  Tajika et al. ................... 347/43
6,120,141 A    9/2000  Tajika et al. ................... 347/96
6,257,691 B1   7/2001  Iwasaki et al. ................ 347/15
6,264,320 B1   7/2001  Moriyama et al. ........... 347/101
6,530,646 B2 * 3/2003  Otsuki .......................... 347/41

FOREIGN PATENT DOCUMENTS

EP    0 595 658    5/1994
EP    0 622 212    11/1994
JP    6-135013     5/1994

* cited by examiner

Primary Examiner—Lamson Nguyen
(74) Attorney, Agent, or Firm—Fitzpatrick, Cella, Harper & Scinto

(57) ABSTRACT

An ink-jet printing apparatus and an ink-jet printing method allow the printing of an image with high quality without causing a change in ink color formed on the printing medium while keeping the printing conditions constant regardless of changing of the number of nozzles to be printed and the amount of transferring of the printing medium. This printing is performed, for example, by restricting use of the number of nozzles, which belong to a nozzle row located on an upstream side in the sub-scan direction, before changing the amount of transferring of the printing medium; and restricting use of the number of nozzles, which belong to the nozzle rows located on a downstream side in the sub-scan direction, after changing the amount of transferring of the printing medium.

16 Claims, 11 Drawing Sheets

INK-JET PRINTING APPARATUS AND INK-JET PRINTING METHOD

This application is based on Patent Application No. 2001-30186 filed Feb. 6, 2001 in Japan, the content of which is incorporated hereinto by reference.

BACKGROUND OF THE INVENTION

1. Field of the Invention

The present invention relates to an ink-jet printing apparatus of a so-called serial scan type and a method for performing ink-jet printing using such an apparatus.

2. Description of the Related Art

An ink-jet printing apparatus prints an image on a printing medium such as a sheet of paper or a thin plastic sheet by ejecting ink from an ink-jet printing head onto the surface of the printing medium, fixing the ink, and imparting color thereto. A multi-color image can be obtained using a plurality of color inks, such as cyan (C), magenta (M), yellow (Y), and black (Bk). In this case, for example, a typical ink-jet printing head has a plurality of nozzle rows corresponding to their respective color inks, so that the multi-color image can be printed on the printing medium by ejecting ink for each of colors from the nozzle rows (hereinafter, also referred to as nozzle array) onto the printing medium as needed.

For preventing ink from blotting on the image printed on the printing medium (e.g., a sheet of paper), ink with a comparatively high permeability is often used as ink of each color except black. Also, ink with comparatively low permeability is often used as a black ink for the printing of a character image because it is capable of printing the edge of the character image sharply. If the black ink with a high permeability is used, on the other hand, the edge of the character becomes jagged. In other words, when the black ink touches on the surface of the paper, the black ink may move along fibers of the paper such that it sinks into the paper quickly compared with other color inks.

For an ink-jet printing system, from above point of view, it is usual to use an ink composition with comparatively low permeability as a black ink and an ink composition with comparatively high permeability as each of color inks. In such an ink-jet printing system, the blotting of ink may be caused on the boundary between a black image (i.e., an image formed by ink of black) and the color image (i.e., an image formed by at least one color ink except black) when the black ink and the other color inks make contact with each other on the printing medium. Hereinafter, such a blotting of ink will be referred to as "a black-color blotting".

For avoiding or relieving the problem to be caused by the blotting of ink on the printing medium, as shown in FIG. 7, there is a method of arranging nozzle rows of a printing head in a serial scan type ink-jet printing apparatus. Such a printing apparatus sequentially performs the image formation on a printing medium by repeating a scanning of the printing head in the main-scan direction and a transfer of the printing medium in the sub-scan direction perpendicular to the main-scan direction. When the printing head is scanning, ink is ejected from nozzles arranged on the printing head.

Referring now to FIG. 7, there is shown an ink-jet printing head H provided with the ink-jet printing apparatus. The printing head H has several nozzle rows arranged in parallel on the surface thereof. Each nozzle row consists of a series of nozzles and extends in the direction Y for transferring a printing medium P (i.e., the sub-scan direction Y). These nozzle rows include: a nozzle row Bk for ejecting ink of black; a set of nozzle rows C1 and C2 for ejecting ink of cyan; a set of nozzle rows M1 and M2 for ejecting ink of magenta, and a set of nozzle rows Y1 and Y2 for ejecting ink of yellow. In the figure, the arrow X1 indicates the forward movement of the printing head H in the main-scan direction, while the arrow X2 indicates the backward movement thereof. In this conventional example, the printing head H is able to perform printing movements in both directions X1, X2 (i.e., bi-directional printing movement). If the printing head H scans in the forward direction X1, for example, it is allowed to perform the printing movement by ejecting ink from nozzle rows C1, M1, and Y1, respectively (i.e., the forward printing movement). If the printing head H scans in the backward direction X2, on the other hand, it is allowed to perform the printing movement by ejecting ink from nozzle rows C2, M2, and Y2, respectively (i.e., the backward printing movement). In these forward and backward printing movements, it is possible to eject black ink from the nozzle rows Bk as needed.

In the case of printing an image using only black ink, nozzles arranged on the entire length "A" of the black nozzle row Bk can be used. As shown in FIG. 7, the nozzle row Bk is designed to be longer than other nozzle rows C1, C2, M1, M2, Y1, and Y2, so that an area of the printing medium on which an image can be printed by the nozzle row Bk per one scanning movement of the printing head H (hereinafter, such an area is referred to as a printing area) can be larger than a printing area on which an image is printed by at least one of other nozzle rows C1, C2, M1, M2, Y1, and Y2. Therefore, a high-speed printing of a mono-color image only with black ink can be realized.

In the case of printing a multi-color image, a part "a" of the nozzle row Bk is used. In this case, in addition, a part "b" (with a length equal to the part "a") of each of the nozzle rows C1, C2, M1, M2, Y1, and Y2 is also used. First, the printing medium P is moved to the position [1] and then the printing head H is moved in the direction X1 while ejecting black ink from the part "a" of the nozzle row Bk depending on an image to be printed (hereinafter, referred to as a printing image). As a result, the image is printed on an area S1 on the printing medium P. Subsequently, the printing medium P is moved from the position [1] to the position [2]. In this case, the position [2] is apart from the position [1] at a distance corresponding to the length of the part "a" in the sub-scan direction Y. Then, the printing head H is moved in the direction X2 while ejecting cyan ink, magenta ink, and yellow ink from the respective parts "b" of the nozzle rows C2, M2, and Y2 (hereinafter, these inks are collectively referred to as "color inks") to complete the formation of a multi-color image on the area S1 on the printing medium P. During the period of moving the printing head H in the direction X2, an additional image formation is performed on a next area S2 on the printing medium P by ejecting black ink from the part "a" of the nozzle row Bk depending on the printing image. Subsequently, the location of the printing medium P is shifted to the position [3] apart from the position [2] by the length of the part "a" in the sub-scan direction Y. Then, the printing head H is moved in the direction X1 while ejecting color inks from the respective parts "b" of the nozzle rows C2, M2, and Y2 to complete the formation of a multi-color image on the area S2 on the printing medium P. During the period of moving the printing head H in the direction X1, an additional image formation is performed on a next area S3 on the printing medium P by ejecting black ink from the part "a" of the nozzle row Bk depending on the printing image.

In such a printing method, the black ink is applied on the predetermined area of the printing medium P at first and then the color inks are applied on the same area during the next scanning movement of the printing head H. Therefore, a pass time between a performing time of the printing by the black ink and a performing time of the printing by the color inks is long. Consequently, it is preferable to prevent ink from blotting on the printing medium P, compared with the case of applying black and color inks on the printing medium P during the same scanning movement of the printing head H. In other words, the above method allows the decrease in the black-color blotting because the time required for the permeation and fixation of black ink into the printing medium P can be secured prior to applying color ink on the printing medium.

Furthermore, as shown in FIG. 8, for printing an image on a top-end portion of the printing medium P by the ink-jet printing apparatus, the distance between the printing medium P and the printing head H can be varied in a predetermined range. That is, the top-end portion of the printing medium P is located upstream between a transport roller R1 and a pinch roller R2 and is free of a discharge roller R3 and a discharge spur R4. Therefore, the distance between the printing medium P and the printing head H can be varied in a predetermined range according to a property of the printing medium P and a variation of application of ink on the printing medium P. Subsequently, as shown in FIG. 9, the variation in distance between the printing medium P and the printing head H decreases as the leading or top-end portion of the printing medium P becomes introduced between the discharge roller R3 and the discharge spur R4. In other words, the variation in distance between the printing medium P and the printing head H increases until the top-end portion of the printing medium P enters between the discharge roller R3 and the discharge spur R4. Then, the distance between the printing medium P and the printing head H varies when the top-end portion of the printing medium P enters between the discharge roller R3 and the discharge spur R4. Therefore, in the case of using the printing method as shown in FIG. 7, the printing position of an image can be shifted before and after intermittent transport of the printing medium P (hereinafter, also referred to as paper feed) when the image formation is performed on the top-end portion of the printing medium P.

For solving such a problem, there is a method in which the number of nozzles to be used for printing an image on a printing medium P is reduced until the top-end portion of the printing medium P enters between the discharge roller R3 and the discharge spur R4 or the length of the nozzle row to be used is previously shortened. In the method, the amount of intermittent transport of the printing medium P, i.e., the amount of paper feed is minimized on basis of the reduced nozzle number or the shorted nozzle row length. Such a method is able to complete the image formation with a comparatively small variation in distance between the printing medium P and the printing head H to relieve the problem in which the location of printing an image is shifted from the predetermined position.

Depending on the image data to be printed, there may be a case where a large amount of current that exceeds the capacity of a power supply is required for driving the printing head H. In such case, the amount of current to be required for driving the printing head H can be minimized by decreasing the number of nozzles to be used in the image formation or by shortening the length of each nozzle row to be used. In general, the number of data to be printed is counted every predetermined printing area, followed by determining whether there is a need for the control of decreasing the amount of current for driving the printing head H on the basis of the resulting count. If there is a need for the control, then the number of nozzles or the length of each nozzle row to be used in the image formation is restricted.

Accordingly, such a requirement restricts the number of nozzles or the length of each nozzle row to be used in the image formation.

In such a restriction, for example, a printing method shown in FIG. 10 may be applied. In the case of performing a normal printing movement by the printing method shown in FIG. 10, the same procedures as those of FIG. 7 described above may be performed. That is, the entire area A of the nozzle row Bk is used for the image formation only with black ink, or the part "a" of the nozzle row Bk and the part "b" of each of the nozzle rows C1, C2, M1, M2, Y1, and Y2 are used for the multi-color image formation. If there is a need to restrict the number of nozzles to be used in the image formation, the part "a'" of the nozzle row Bk and the part "b'" (with a length equal to the part "a'") of each of the nozzle rows C1, C2, M1, M2, Y1, and Y2 are used.

In FIG. 10, just as in the case of FIG. 7, there are shaded portions. The shaded portion with lines slanting downward from right to left is an area on which an image can be printed using the nozzle row Bk. On the other hand, the shaded portion with lines slanting downward from left to right is an area on which an image can be printed using the nozzle rows C1, C2, M1, M2, Y1, and Y2. Therefore, the shaded portion with lines slanting downward from right to left and slanting downward from left to right is an area on which the image is printed using the nozzle rows C1, C2, M1, M2, Y1, and Y2 after the image is printed using the nozzle row Bk.

Referring again to FIG. 10, the printing movement will be explained. The printing movement is under the conditions in which the number of nozzles to be used for the printing is restricted. If the printing medium P is transferred to the position [1], just as in the case of FIG. 7, then the image formation is performed on both areas S1, S2 on the printing medium P by ejecting black ink from the part "a" of the nozzle row Bk on the basis of image data to be printed. Here, if there is a need for restricting the number of nozzles or the length of each nozzle row to be used in the image formation due to the same fact as described above, the image is printed using the part "a'", which is one-half of the part "a" (i.e., a'=a/2) of the nozzle row Bk and the part "b'", which is one-half of the part "b" (i.e., b'=b/2) of each of the nozzle rows C1, C2, M1, M2, Y1, and Y2. That is, the printing medium P is transferred to the position [2] and then color ink is ejected from the part "b'" of each of the nozzle rows C2, M2, and Y2 on the basis of the printing image to complete a multi-color image formation on the area S1 of the printing medium P. At this time, black ink is ejected from the part "a'" of the nozzle row Bk on the basis of the printing image, so that an image can be printed on the next area S3 on the printing medium P. Subsequently, the printing medium P is transferred to the position [3] at a distance of the length of the part "a'" from the position [2] in the sub-scan direction Y. Then, color ink is ejected from the part "b'" of each of the nozzle rows C1, M1, and Y1 on the basis of the printing image to complete a multi-color image formation on the area S2 of the printing medium P. At this time, black ink is ejected from the part "a'" of the nozzle row Bk on the basis of the printing image, so that an image can be printed on the next area S4 on the printing medium P.

In the case shown in FIG. 10, therefore, if there is a need to restrict the number of nozzles or the length of the nozzle row to be used in the printing, the image formation may be performed using one-half of the nozzles generally used in the printing and reducing the amount of paper feed by half.

If there is a need to restrict the number of nozzles or the length of the nozzle row to be used in the printing, alternatively, another printing method may be applied as shown in FIG. 11. For performing the normal printing operation by the printing method shown in FIG. 11, just as in the case of FIG. 7 described above, the entire area "A" of the nozzle row Bk is used when the image formation requires only black ink, while the part "a" of the nozzle row Bk and the part "b" (with a length equal to the part "a") of each of nozzle rows C1, C2, M1, M2, Y1, and Y2 is used for printing a multi-color image. If there is a need to restrict the number of nozzles, the part "a" of the nozzle row Bk is divided into an upper half portion "a1" and a lower half portion "a2" and the part "b" of each of nozzle rows C1, C2, M1, M2, Y1, and Y2 is also divided into an upper half portion "b1" and a lower half portion "b2" so that these half portions can be used independently.

In the state [1], just as in the case with FIG. 7, the images are formed on the areas S1, S2 on the printing medium P respectively by ejecting black ink from the part "a" of the nozzle row Bk depending on the printing image. Subsequently, the printing medium P is moved by the length of the part "a" of the nozzle row Bk, followed by ejecting color inks from the upper portion "b1" of each of nozzle rows C2, M2, and Y2 onto the area S1 of the printing medium P depending on the printing image in the state [2] to complete the formation of a multi-color image on that area S1. At this time, black ink is ejected from the upper portion "a1" of the nozzle row Bk onto the next area S3 of the printing medium P depending on the printing image, so that an image can be printed on that area S3 on the printing medium P. After that, in the state [3], color inks are ejected from the lower portion "b2" of each of nozzle rows C1, M1, and Y1 onto the area S2 of the printing medium P depending on the printing image to complete the formation of a multi-color image on that area S2, without feeding the printing medium P. At this time, black ink is ejected from the lower portion "a2" of the nozzle row Bk onto the next area S4 of the printing medium P depending on the printing image, so that an image can be printed on that area S4 on the printing medium P. Subsequently, the printing medium P is fed by the length of the part "a" of the nozzle row Bk. In the states [4] and [5], the same printing movements as those performed in the states [2] and [3] are repeated.

However, if there is a need to restrict the number of nozzles or nozzle rows to be used in the printing, in the case of using the printing methods shown in FIG. 10 and FIG. 11, there is a difference between the printing movement under the restriction and the normal printing movement under no restriction with respect to the timing of printing with a nozzle row for ejecting black ink, paper feed, and printing with nozzle rows for ejecting color inks.

In other words, in the normal printing movement, the formation of a printing image on an arbitrary printing area of the printing medium P can be completed by sequentially performing the steps of printing with the nozzle row for ejecting black ink, feeding the printing medium P, and printing with the nozzle rows for ejecting color inks. On the other hand, in the printing movement in which the number of nozzles or the length of the nozzle rows is restricted, in the case of the printing method shown in FIG. 10, the formation of a printing image on an arbitrary printing area of the printing medium P can be completed by sequentially performing the steps of printing with the nozzle row for ejecting black ink, feeding the printing medium P two times, and printing with the nozzle rows for ejecting color inks. In the case of the printing method shown in FIG. 11, furthermore, the formation of a printing image on an arbitrary printing area can be completed by sequentially performing the steps of printing with the nozzle row for ejecting black ink, feeding the printing medium, waiting for the printing movement (at this time, the printing movement on another printing area using nozzle rows for ejecting color inks is performed), and printing with the nozzle rows for ejecting color inks. Alternatively, the formation of such a printing image may be completed by sequentially performing the steps of printing with the nozzle row for ejecting black ink, waiting for the printing movement (at this time, the printing movement on another printing area using nozzle rows for ejecting color inks is performed), feeding the printing medium, and printing with the nozzle rows for ejecting color inks. In each of the printing methods shown in FIG. 10 and FIG. 11, therefore, when the number of nozzles or the length of the nozzle rows is restricted, an area printed by using the nozzle row for ejecting black ink is not printed by using the nozzle rows for ejecting color inks by the next printing scan. That area printed by using the nozzle row for ejecting black ink is printed by using the nozzle rows for ejecting color inks by the subsequent printing scan after that next printing scan to complete the image formation.

Consequently, there is a problem in which the printing quality of an image can be decreased when the printing movement with the restriction on the number of nozzles or the length of the nozzle rows and the printing movement without such a restriction are different from each other. In other words, they are different with respect to the degrees of permeation and fixation of black ink previously placed on the predetermined printing area of the printing medium when color inks are subsequently placed on that area. Therefore, there is a possibility of causing some trouble in the resulting image, such as undesired image-printing variations (e.g., inconsistencies in image density), by the difference in ink colors that come out or are formed on the printing medium.

SUMMARY OF THE INVENTION

It is an object of the present invention to provide a method and apparatus for ink-jet printing, which allows the printing of a high-quality image by keeping the conditions for printing movement to avoid variations in ink colors coming out on the printing medium regardless of the change in the number of nozzles to be used in the printing of an image and also regardless of the change in the amount of transferring the printing medium.

In the first aspect of the present invention, there is provided an ink-jet printing apparatus using a printing head having a plurality of nozzle rows each arranging nozzles for ejecting ink, to print an image on a printing medium by repeating the steps of ejecting ink from the nozzle rows of the printing head onto the printing medium while moving the printing head in a main-scan direction and transferring the printing medium in a sub-scan direction perpendicular to the main-scan direction, wherein:

at least one of the plurality of the nozzle rows of the printing head is arranged on a position displaced from other nozzle rows in the sub-scan direction, the ink-jet printing apparatus comprising:

changing means capable of changing the amount of transferring the printing medium; and control means for restricting the number of nozzles to be used in the printing, which belong to the nozzle row located on an upstream side in the sub-scan direction, before changing the amount of transferring the printing medium by the changing means, and restricting the number of nozzles to be used in the printing, which belong to the nozzle row located on a downstream side in the sub-scan direction, after changing the amount of transferring the printing medium by the changing means.

In the second aspect of the present invention, there is provided an ink-jet printing method using a printing head having a plurality of nozzle rows each arranging nozzles for ejecting ink, to print an image on a printing medium by repeating the steps of ejecting ink from the nozzle rows of the printing head onto the printing medium while moving the printing head in a main-scan direction and transferring the printing medium in a sub-scan direction perpendicular to the main-scan direction, wherein:

at least one of the plurality of the nozzle rows of the printing head is arranged on a position displaced from other nozzle rows in the sub-scan direction, the ink-jet printing method comprising the steps of:

restricting the number of nozzles to be used in the printing, which belong to the nozzle row located on an upstream side in the sub-scan direction before changing the amount of transferring the printing medium; and restricting the number of nozzles to be used in the printing, which belong to the nozzle row located on a downstream side in the sub-scan direction, after changing the amount of transferring the printing medium.

According to the present invention in one preferred mode, the number of nozzles to be used in the printing, belonging to the nozzle rows positioned on the upstream in the sub-scan direction, is restricted prior to change of the amount of transferring the printing medium. In addition, the number of nozzles to be used in the printing, belonging to the nozzle rows positioned downstream in the sub-scan direction, is restricted after the change the amount of transferring the printing medium. Consequently, the same printing conditions as those of the normal printing movement can be kept regardless of the change in the amount of transferring the printing medium and also regardless of the change in the number of nozzles to be used in the printing of an image. As a result, the printing of a high-quality image can be performed without variations in ink colors coming out on the printing medium.

DETAILED DESCRIPTION OF PREFERRED EMBODIMENTS

Preferred embodiments of the present invention will be explained with reference to the accompanying drawings.

(First Preferred Embodiment)

Figure 1:
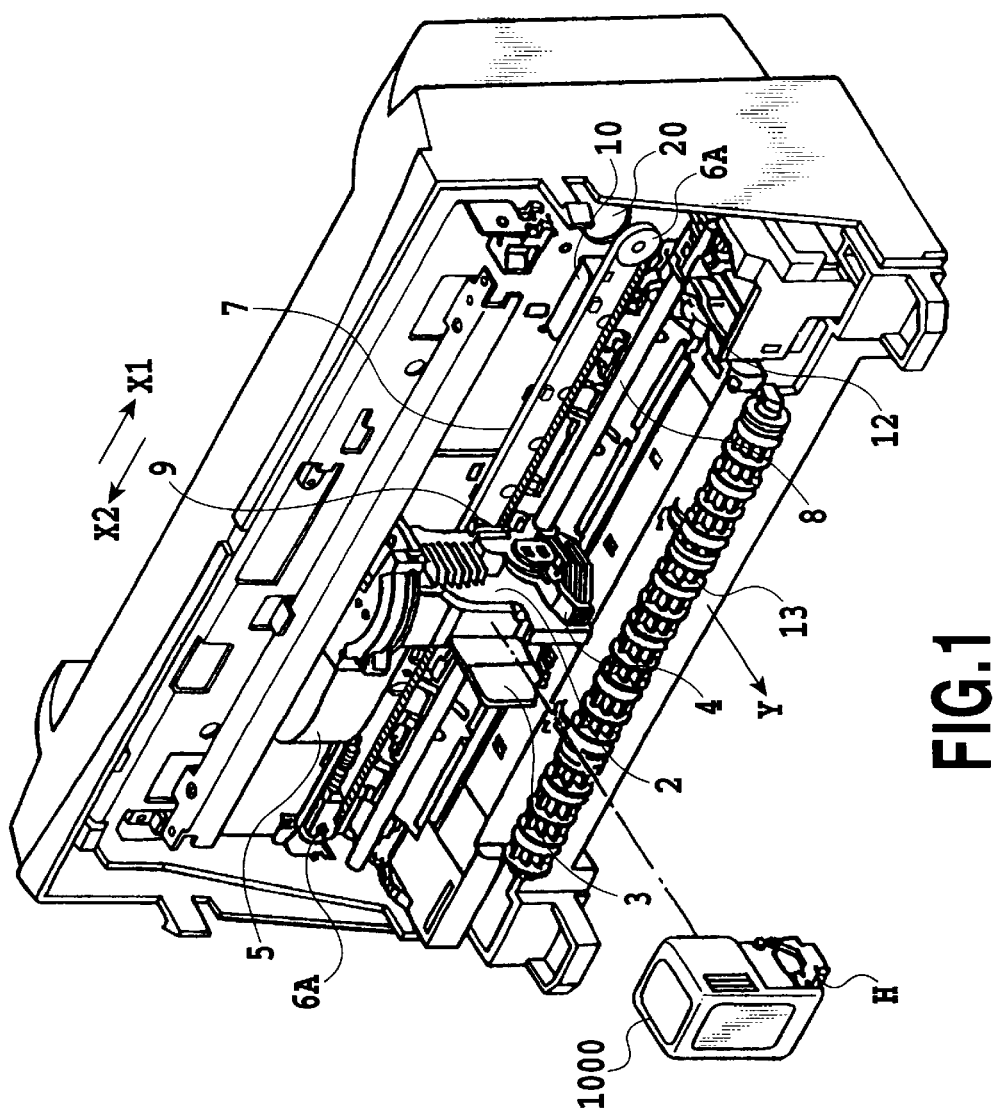
FIG. 1 is a perspective view of the main part of the printing apparatus as the first preferred embodiment of the present invention.

FIG. 1 is a perspective view for illustrating the generic configuration of an ink-jet printing apparatus as a first preferred embodiment of the present invention.

In FIG. 1, reference numeral 1000 denotes a detachable ink-jet cartridge which can be exchanged with a new one as needed. The ink-jet cartridge 1000 comprises an ink-jet printing head H and an ink tank for supplying ink into such a printing head H, which are coupled together. Reference numeral 2 denotes a carriage unit on which the cartridge 1000 can be mounted. The carriage unit 2 can be guided along a guide shaft 8 to freely move back and forth in the main-scan direction as indicated by the arrows X1, X2. Also, the carriage unit 2 is coupled to a belt 7 turned around pulleys 6A, 6B, so that the carriage 2 can be moved in the main-scan direction by transmitting the driving force of a carriage motor 20 through the belt 7. The cartridge 1000 can be held in a holder 3 of the carriage unit 3 by placing the cartridge 1000 in position by actuating a fixing lever 4. Electric contacts of the cartridge 1000 are contacted with those of the carriage unit 2 when the cartridge 100 is fixed in position. Reference numeral 5 is a flexible cable for transmitting signals from a control part to the cartridge 1000. The movement of the carriage 2 to its home position can be detected by a transmission photo-coupler 9 attached on the carriage 2 and a shield plate 10 attached on a main body of the apparatus. A home position unit 12 located at the home position comprises a recovery system. The recovery system includes a cap member for capping the surface of the printing head H on which ink-ejection ports are formed (hereinafter, simply referred to as an ink-ejection surface), a suction means for suctioning ink from the cap member, a wiping member for wiping the ink-ejection surface of the printing head H, and so on. An ejection roller 13 cooperates with a spur roller (not shown) to nip the printing medium and eject it outside. These rollers and a line-feed unit including a paper-feed roller, a pinch roller and so on make up transport means for transporting the printing medium in the sub-scan direction of the arrow Y.

Figure 2:
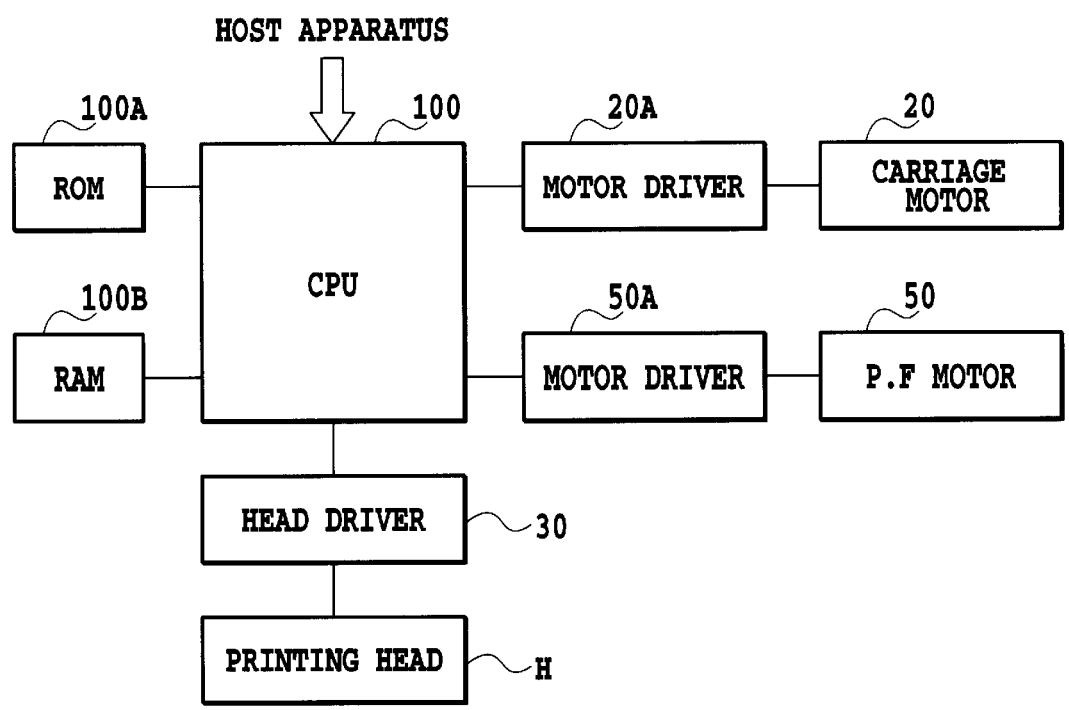
FIG. 2 is a block diagram for illustrating the control system of the printing apparatus shown in FIG. 1.

FIG. 2 is a block diagram that illustrates the configuration of a control system of the ink-jet printing apparatus shown in FIG. 1.

In FIG. 2, a central processing unit (CPU) 100 is responsible for the processing of control of the operation of each component of the printing apparatus and the processing of data. A read-only memory (ROM) 100A stores the processing procedures and a random-access memory (RAM) 100B is used as a work area for actuating these processing procedures. The printing head H comprises printing elements for ejecting ink from their corresponding nozzles. The ejection of ink from each nozzle can be performed by supplying driving data and driving-control signals from the CPU 100 to a head driver 30 to actuate the corresponding printing element. The printing element may include an electro-thermal transducer element arranged in the nozzle. In this case, a bubble is formed in the ink by thermal energy generated from the electro-thermal transducer element and such energy for forming the bubble allows the ejection of ink from the ink-ejection ports of the nozzle. Furthermore, the carriage motor 20 for moving the carriage unit 2 and a paper-feed (P.F) motor 50 for transporting the printing medium can be controlled by the CPU 100 through the motor drivers 20A, 50A, respectively.

Figure 3:
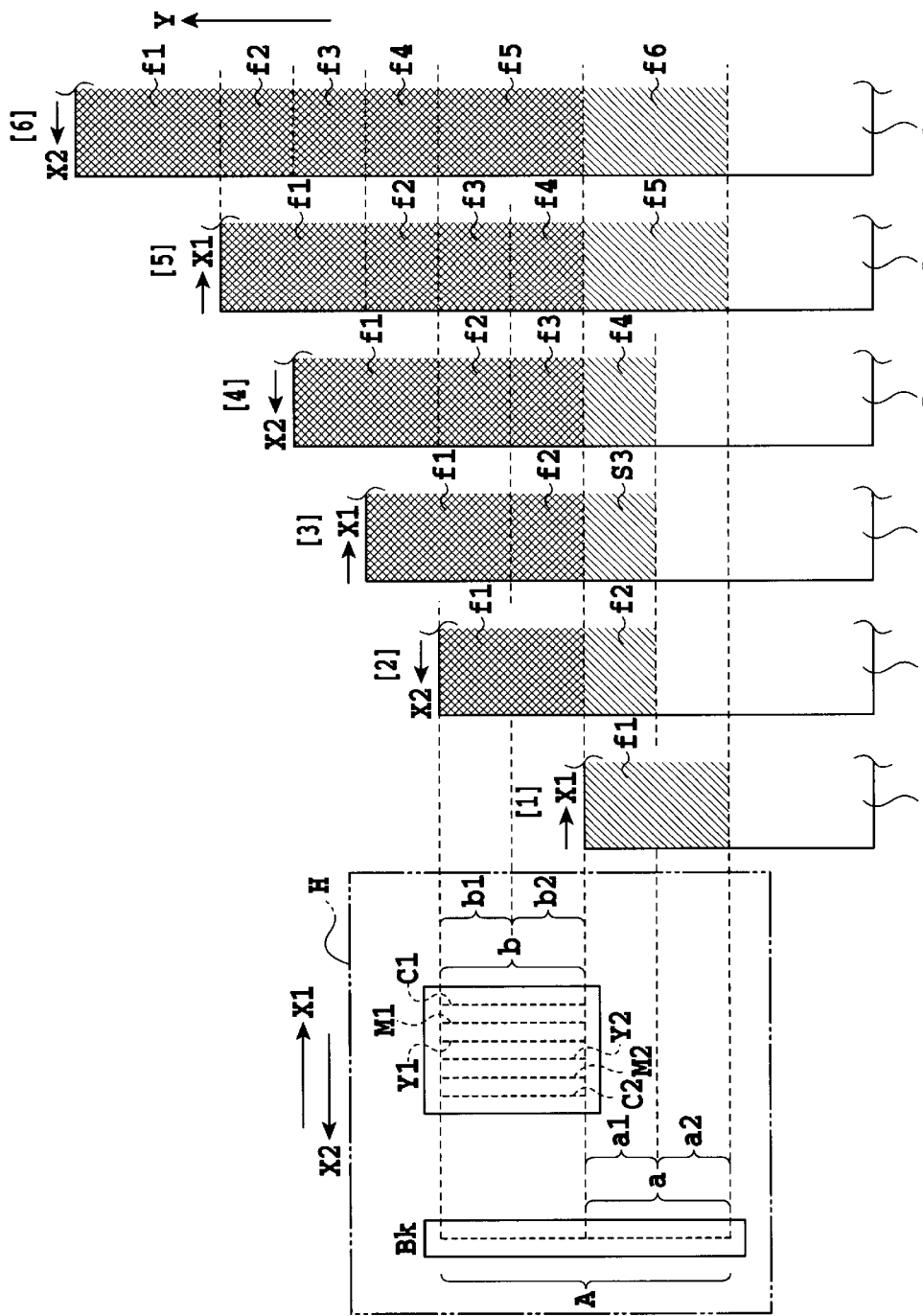
FIG. 3 is an explanation view for illustrating the printing movement in the first preferred embodiment of the present invention.

FIG. 3 is an explanation diagram for illustrating a printing method of the present embodiment. The same reference numerals are used for indicating the same components as those of the above conventional example to abbreviate their explanations. The printing head to be explained in the present embodiment is one comprising a plurality of nozzle rows on which nozzles for ejecting ink are arranged. At least one of the nozzle rows is located at a position deviated in the sub-scan direction from the positions on which other nozzle rows are arranged.

Figure 7:
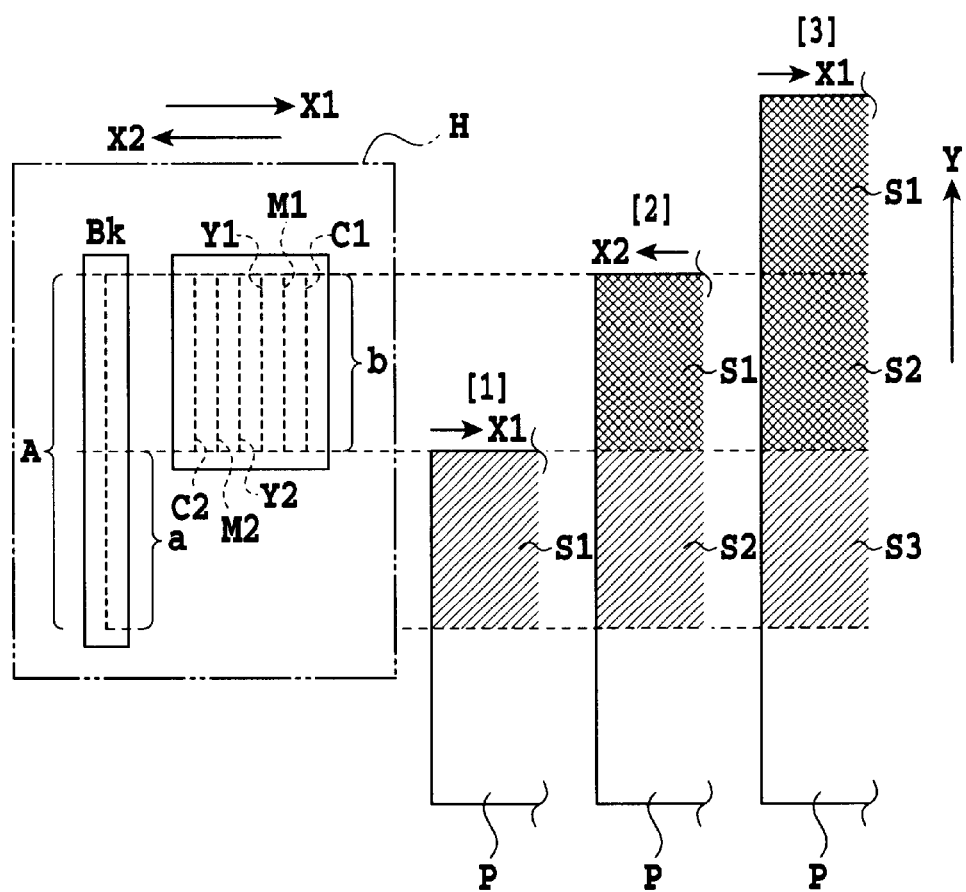
FIG. 7 is an explanation view for illustrating the printing movement of the conventional printing apparatus.
Figure 8:
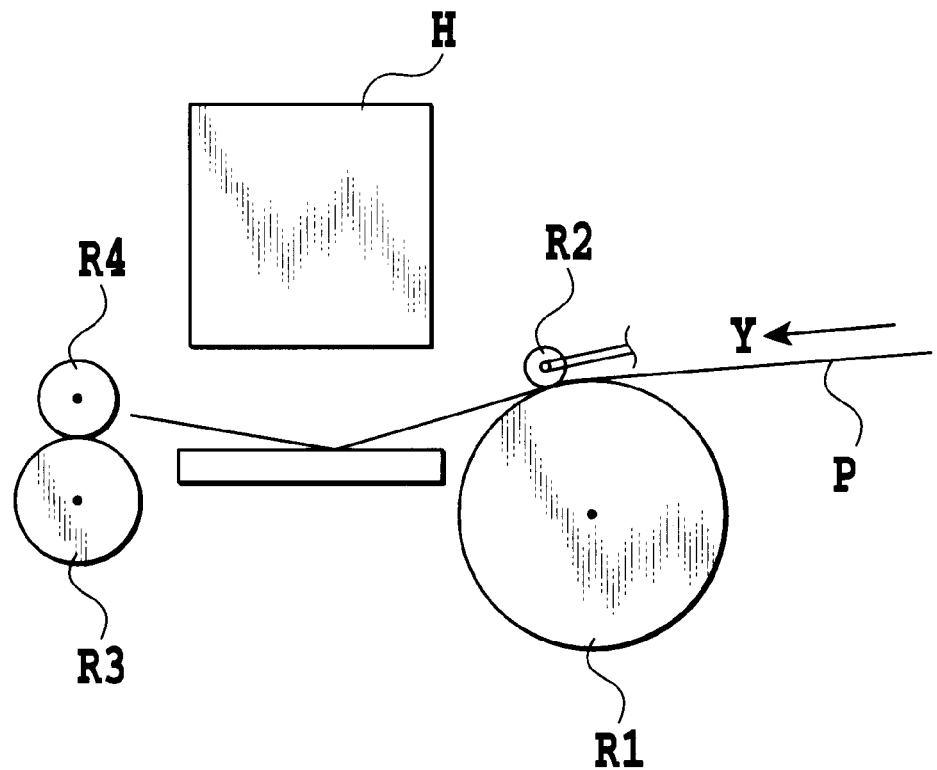
FIG. 8 is an explanation view for illustrating the situation in which there emerged a need for restricting the number of nozzles to be used in the printing.
Figure 9:
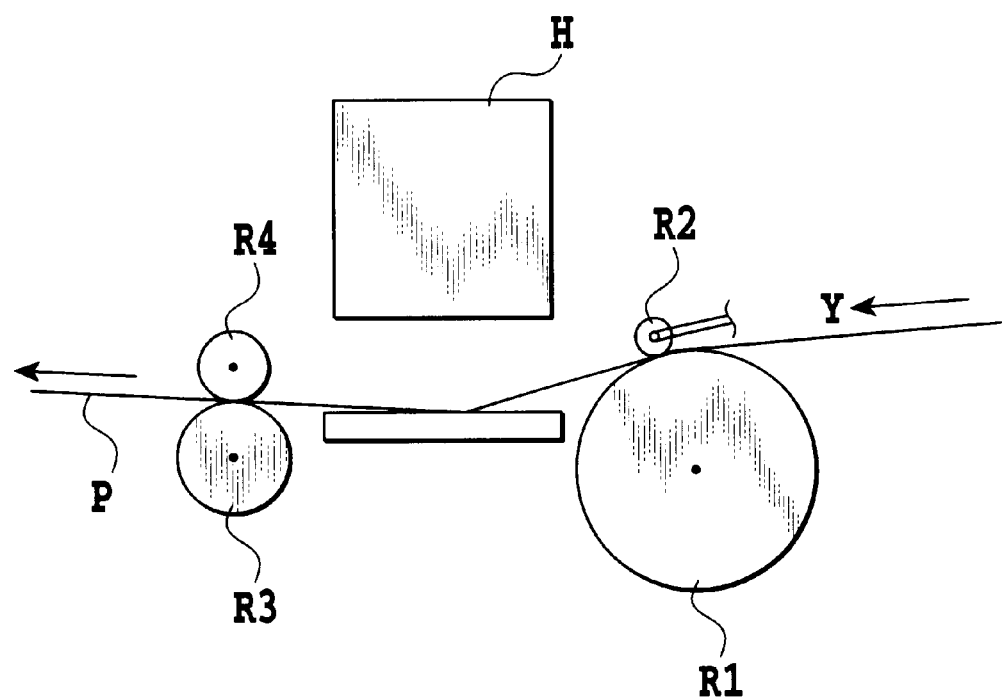
FIG. 9 is an explanation view for illustrating the situation in which there is no need to restrict the number of nozzles to be used in the printing.
Figure 10:
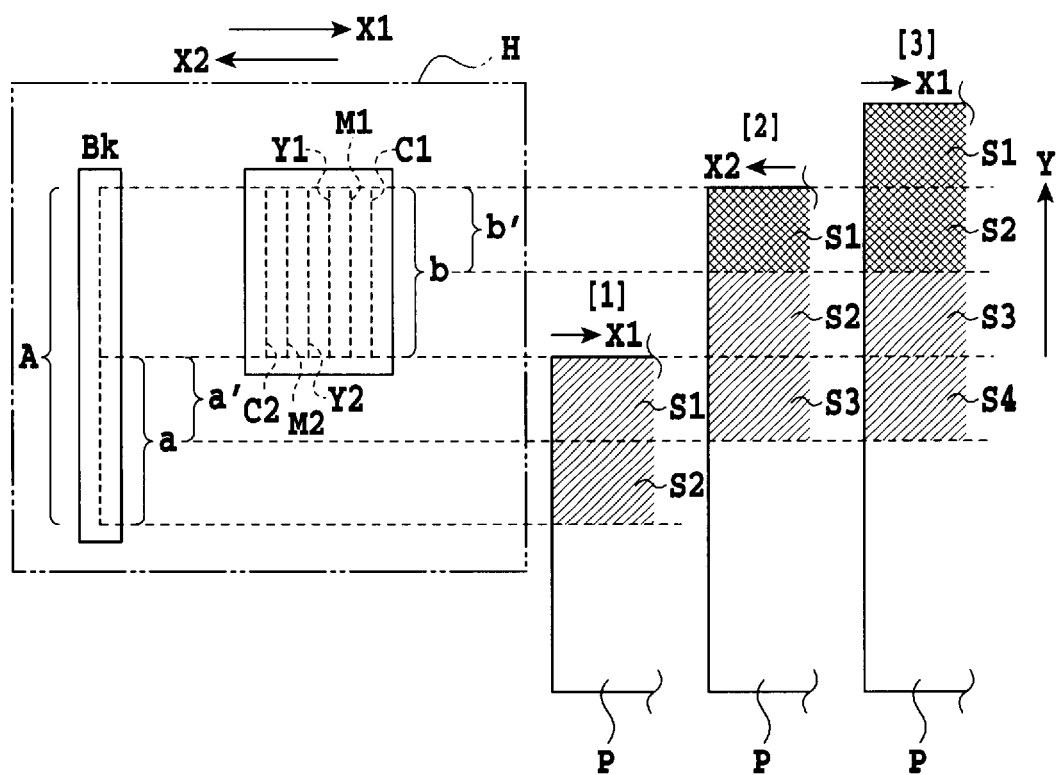
FIG. 10 is an explanation view for illustrating the printing movement of the conventional printing apparatus when the amount of transferring the printing medium is changed.
Figure 11:
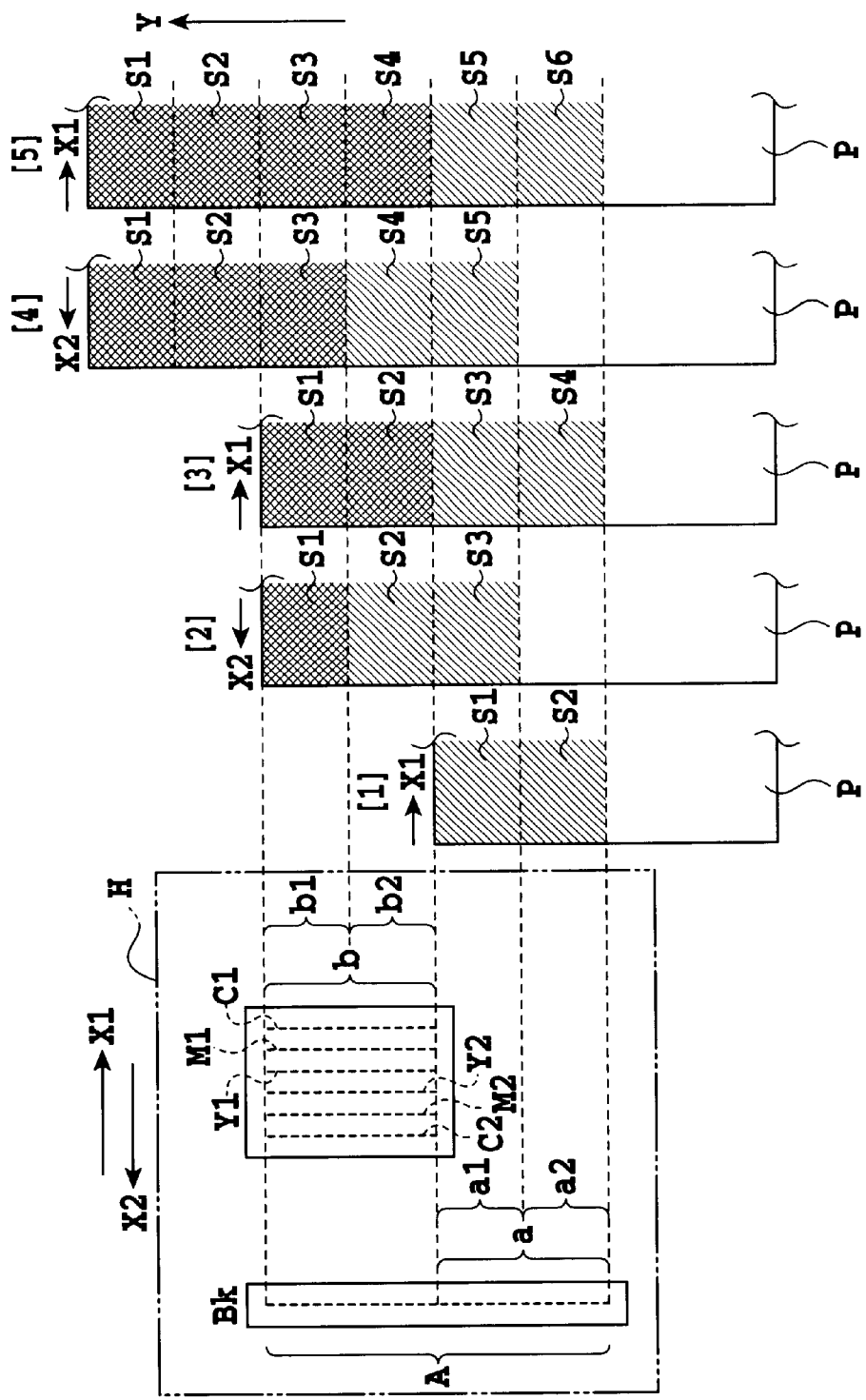
FIG. 11 is an explanation view for illustrating another printing movement of the conventional printing apparatus when the amount of transferring the printing medium is changed.

In the case of performing the normal printing movement, just as in the case with FIG. 7 described above, the entire area A of the nozzle row Bk is used for the formation of an image only with black ink. On the other hand, the part "a" of the nozzle row Bk and the part "b" (with a length equal to the part "a") of each of nozzle rows C1, C2, M1, M2, Y1, and Y2 are used for the formation of a multi-color image.

If there is a need for restricting the number of nozzles to be used in the printing, the part "a" of the nozzle row Bk is divided into an upper half portion "a1" (=a/2) and a lower half portion "a2" (=a/2) and the part "b" of each of nozzle rows C1, C2, M1, M2, Y1, and Y2 is also divided into an upper half portion "b1" (=b/2) and a lower half portion "b2" (=b/2) so that these half portions can be used independently. In FIG. 3, just as in the case with the conventional example, there are shaded portions. The shaded portion with lines slanting downward from right to left is an area on which an image can be printed using the nozzle row Bk. On the other hand, the shaded portion with lines slanting downward from left to right is an area on which an image can be printed using the nozzle rows C1, C2, M1, M2, Y1, and Y2.

Hereinafter, a printing movement in the case when the need for restricting the number of nozzles to be used in the printing arises will be explained.

In the state [1], just as in the case with FIG. 7, the formation of an image is performed on an area f1 on the printing medium P by ejecting black ink from the part "a" of the nozzle row Bk depending on the printing image. As indicated in the state [2], subsequently, the printing medium P is fed by the length of the part "a" of the nozzle row Bk. From this point in time, the control for restricting the number of nozzles is initiated. In the state [2], the printing head H is moved in the direction of the arrow X2 while ejecting color inks from the part "b" of each of nozzle rows C2, M2, and Y2 onto the area f1 of the printing medium P depending on the printing image to complete the formation of a multi-color image on that area f1. At this time, black ink is ejected from the upper portion "a1" of the nozzle row Bk onto the next area f2 of the printing medium P depending on the printing image, so that an image can be printed on that area f2 on the printing medium P.

As indicated in the state [3], subsequently, the printing medium P is fed by a half length of the part "a" of the nozzle row Bk (i.e., by a length of a/2). Then, the printing head H is moved in the direction of the arrow X1 while ejecting color inks from the lower portion "b2" of each of nozzle rows C1, M1, and Y1 onto the area f2 of the printing medium P depending on the printing image to complete the formation of a multi-color image on that area f2. At this time, black ink is ejected from the upper portion "a1" of the nozzle row Bk onto the next area f3 of the printing medium P depending on the printing image, so that an image can be printed on that area f3 on the printing medium P. After that, as indicated in the state [4], the printing medium P is fed by a half length of the part "a" of the nozzle row Bk (i.e., by a length of a/2). Then, the printing head H is moved in the direction of the arrow X2 while ejecting color inks from the lower portion "b2" of each of nozzle rows C2, M2, and Y2 onto the area f3 of the printing medium P depending on the printing image to complete the formation of a multi-color image on that area f3. At this time, black ink is ejected from the upper portion "a1" of the nozzle row Bk onto the next area f4 of the printing medium P depending on the printing image, so that an image can be printed on that area f4 on the printing medium P.

Subsequently, during the period that requires the restriction on the number of nozzles to be used in the printing, the above printing movement with the paper feed by a half length of the part "a" of the nozzle row Bk (i.e., by a length of a/2) repeats the image formation using the upper portion "a1" of the nozzle row Bk and the lower portion "b2" of each of the nozzle rows C1, C2, M1, M2, Y1, and Y2.

Next, the case in which the process is returned to the normal printing movement by removing the restriction on the number of nozzles to be used in the printing will be explained. In other words, here, the case in which the process is returned to the normal printing movement after the state [4] will be explained.

As indicated in the states from [4] to [5], the printing medium P is fed by a half length of the part "a" of the nozzle row Bk (i.e., by a length of a/2). Then, the printing head H is moved in the direction of the arrow X1 while ejecting color inks from the lower portion "b2" of each of nozzle rows C1, M1, and Y1 onto the area f4 of the printing medium P depending on the printing image to complete the formation of a multi-color image on that area f4. At this time, just as in the case with the normal printing movement, black ink is ejected from the part "a" of the nozzle row Bk onto the next area f5 of the printing medium P depending on the printing image, so that an image can be printed on that area f5. After that, as indicated in the state [6], the printing medium P is fed by the length of the part "a" of the nozzle row Bk. Then, just as in the case with the normal printing movement, the printing head H is moved in the direction of the arrow X2 while ejecting color inks from the part "b" of each of nozzle rows C2, M2, and Y2 onto the area f5 of the printing medium P depending on the printing image to complete the formation of a multi-color image on that area f5. At this time, just as in the case with the normal printing movement, black ink is ejected from the part "a" of the nozzle row Bk onto the next area f6 of the printing medium P depending on the printing image, so that an image can be printed on that area f6.

Consequently, it is shifted to the normal printing movement, followed by repeating the normal printing movement using the part "a" of the nozzle row Bk and the part "b" of each of the nozzles C1, C2, M1, M2, Y1, and Y2 with the paper feed by the length of the part "a" of the nozzle row Bk.

(Second Preferred Embodiment)

Figure 4:
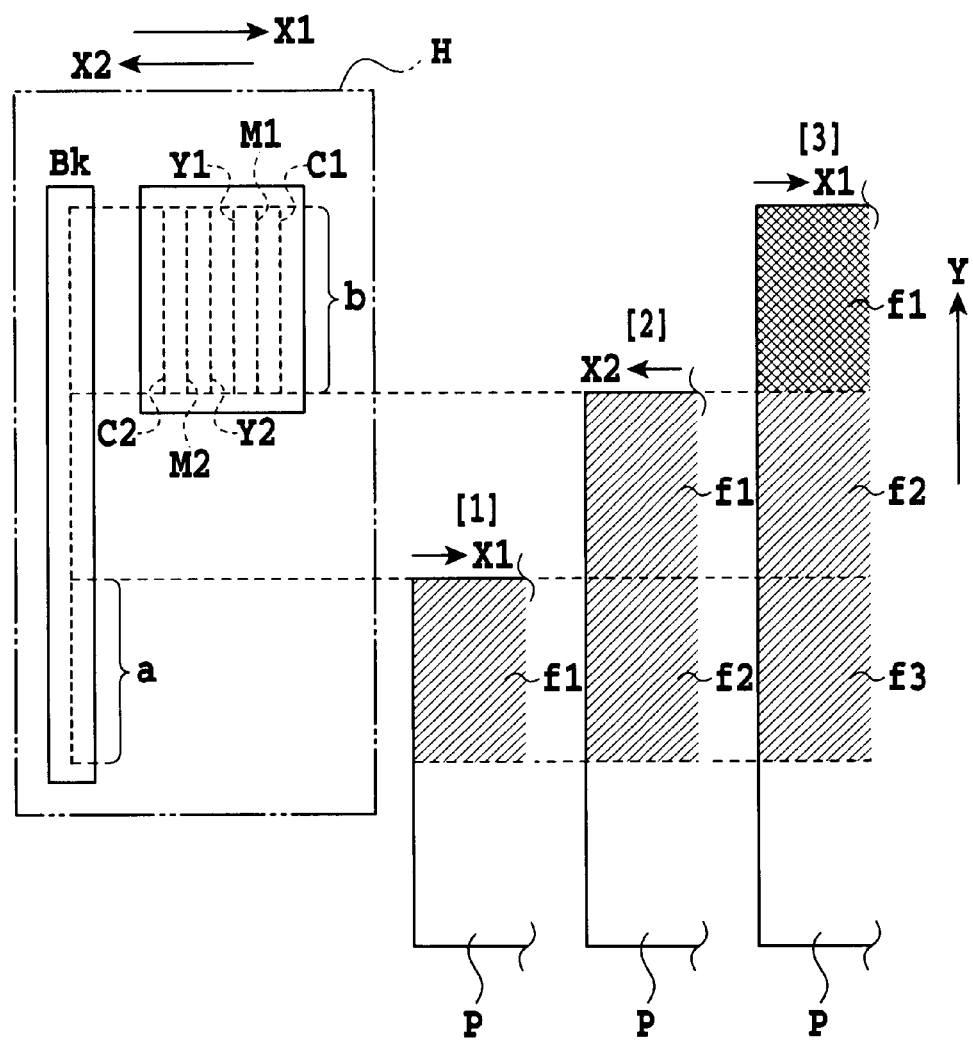
FIG. 4 is an explanation view for illustrating the normal printing movement in the second preferred embodiment of the present invention.
Figure 5:
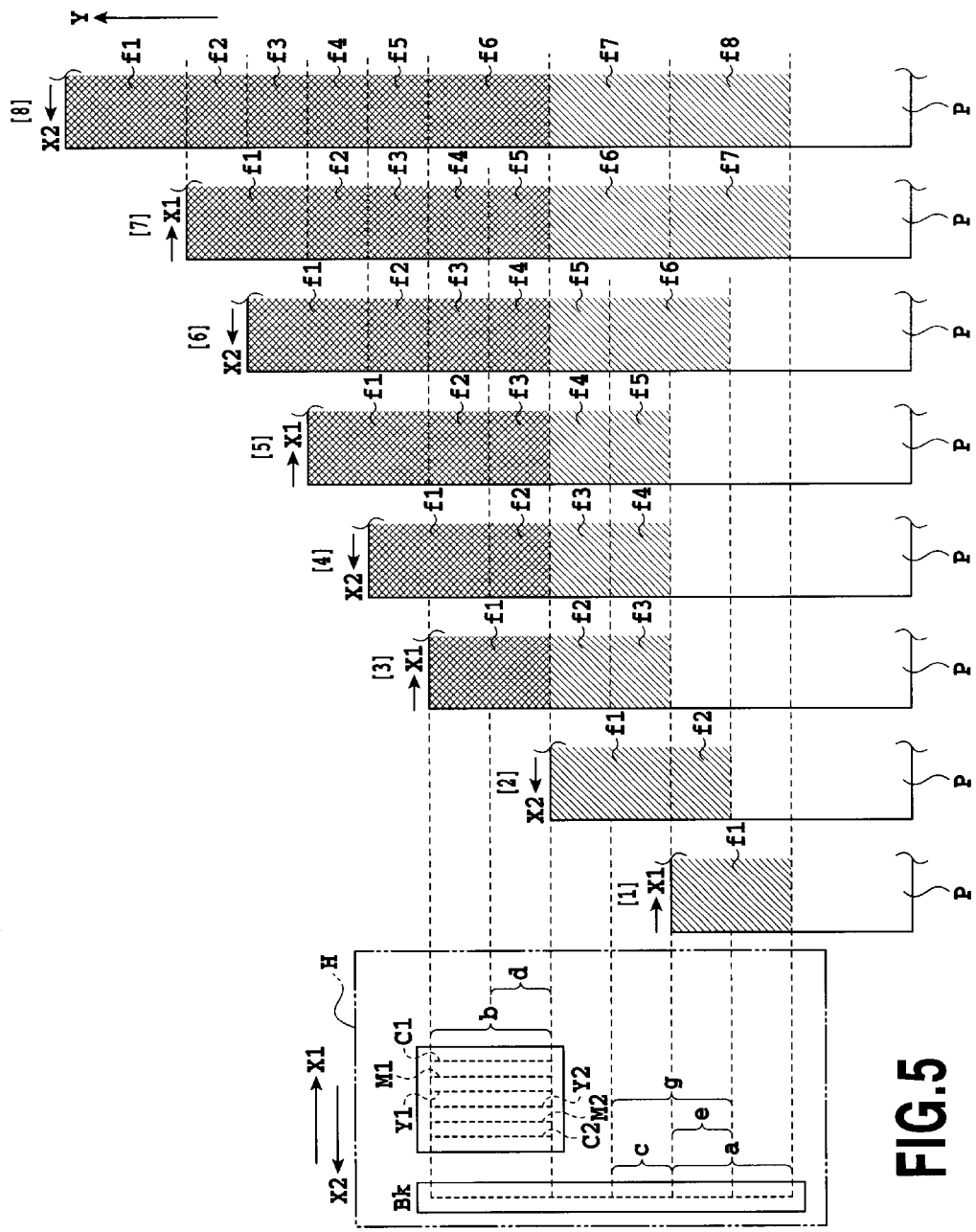
FIG. 5 is an explanation view for illustrating the printing movement in the second preferred embodiment of the present invention, before and after the change in the amount of transferring the printing medium.

Referring now to FIGS. 4 and 5, a second preferred embodiment of the present invention will be described. In this embodiment, the total length of a nozzle row Bk is set to three times as long as the part "b" (with a length equal to the part "a") of each of nozzles C1, C2, M1, M2, Y1, and Y2. The part "a" of the nozzle row Bk is positioned apart from the part "b" by the length of the part "a". In the case of performing the normal printing movement to print an image on the printing medium P using only black ink, the entire area of the nozzle row Bk can be used just as in the case with FIG. 7 described above.

FIG. 4 is a schematic diagram for illustrating the formation of a multi-color image by the normal printing movement.

In the state [1], the printing head H is moved in the direction of the arrow X1 while ejecting black ink from the part "a" of the nozzle row Bk onto the area f1 on the printing medium P depending on the printing image to print an image on that area f1. As indicated in the state [2], subsequently, the printing medium P is fed by the length of the part "a" of the nozzle row Bk. In the state [2], the printing head H is moved in the direction of the arrow X2 while ejecting black ink from the part "a" of the black nozzle Bk to print an image on the area f2 of the printing medium P. Subsequently, as indicated in the state [3], the printing medium P is fed by the length of the part "a" of the nozzle row Bk. In the state [3], the printing head H is moved in the direction of the arrow X1 while ejecting color inks from the part "b" of each of nozzle rows C1, M1, and Y1 onto the area f1 of the printing medium P depending on the printing image to complete the formation of a multi-color image on that area f1. At this time, black ink is ejected from the part "a" of the nozzle row Bk onto the area f3 of the printing medium P depending on the printing image, so that an image can be printed on that area f3. Consequently, the multi-color images can be sequentially formed on the printing medium P by repeating such a printing movement.

Referring now to FIG. 5, the printing movement in which the need for restricting the number of nozzles to be used in the printing arises will be explained. In FIG. 5, the parts "c" and "e" of the nozzle row Bk correspond to half of the length of the part "a" thereof. In addition, the part "c" is adjacent to the part "a", while the part "e" corresponds to the upper half portion of the part "a". The part "g" of the nozzle row Bk is a portion including the parts "c" and "e". In addition, the part "d" of each of nozzle rows C1, C2, M1, M2, Y1, and Y2 corresponds to the lower half portion of the part "b".

In the normal printing movement described above, an area printed by black ink is not printed by color inks in the next printing scan. That area printed by the black ink is printed by using color inks by the subsequent printing scan after that next printing scan to complete the image formation. In the printing movement shown in FIG. 5, for keeping the same printing conditions as those of the normal printing movement, the part "a" of the nozzle row Bk and the part "b" of each of the nozzle rows C1, C2, M1, M2, Y1, and Y2 are used.

In the state [1], the printing head H is moved in the direction of the arrow X1 while ejecting black ink from the part "a" of the nozzle row Bk onto the area f1 of the printing medium P depending on the printing image to print an image on that area f1. As indicated in the state [2], subsequently, the printing medium P is fed by the length of the part "a" of the nozzle row Bk. From this point in time, the control for restricting the number of nozzles is initiated.

For keeping the same printing conditions as those of the normal printing movement, for the area f1, the printing of an image using color inks should be performed by the subsequent printing movement after the state [2]. Therefore, both the amount of paper feed just after the state [2] and the number of nozzles of each of the nozzle rows C1, C2, M1, M2, Y1, and Y2 to be used in the printing are not restricted.

Hence, in the state [2], the printing head H is moved in the direction of the arrow X2 while ejecting black ink from the part "e" of the nozzle row Bk onto the area f2 on the printing medium P depending on the printing image to print an image on that area f2. As indicated in the state [2], subsequently, the printing medium P is fed by the length of the part "a" of the nozzle row Bk. Then, the printing head H is moved in the direction of the arrow X1 while ejecting color inks from the part "b" of each of nozzle rows C1, M1, and Y1 onto the area f1 of the printing medium P depending on the printing image to complete the formation of a multi-color image on that area f1. At this time, black ink is elected from the part "c" of the nozzle row Bk onto the next area f3 of the printing medium P depending on the printing image, so that an image can be printed on that area f3.

At this time, consequently, a multi-color image is completely printed on the area f1 on which the image of black ink is previously printed in the state [1] by the same way as that of the normal printing movement. Subsequently, the amount of paper feed is changed, as indicated in the state [4], so that the printing medium P can be fed by a half length of the part "a" of the nozzle row Bk (i.e., by a length of a/2). Then, the printing head H is moved in the direction of the arrow X2 while ejecting color inks from the lower portion "d" of each of nozzle rows C2, M2, and Y2 onto the area f2 of the printing medium P depending on the printing image to complete the formation of a multi-color image on that area f2. At this time, black ink is ejected from the part "c" of the nozzle row Bk depending on the printing image to print an image on the next area f4 of the printing medium P. As indicated in the state [5], subsequently, the printing medium P is fed by half of the length of the part "a" (i.e., a/2) of the nozzle row Bk. Then, the printing head H is moved in the direction of the arrow X1 while ejecting color inks from the lower half portion "d" of each of nozzle rows C1, M1, and Y1 onto the area f3 of the printing medium P depending on the printing image to complete the formation of a multi-color image on that area f3. At this time, black ink is ejected from the part "c" of the nozzle row Bk onto the next area f5 of the printing medium P depending on the printing image, so that an image can be printed on that area f5.

Consequently, it is shifted to the printing movement in which the number of nozzles to be used in the printing is restricted, followed by repeating the printing movement using the part "c" of the nozzle row Bk and the lower half portion "d" of each of the nozzles C1, C2, M1, M2, Y1, and Y2 with the paper feed by half of the length of the part "a" (i.e., a/2) of the nozzle row Bk. Therefore, the same printing conditions as those of the normal printing movement can be maintained.

Next, the case in which the process is returned to the normal printing movement by removing the restriction on the number of nozzles to be used in the printing will be explained. In other words, here, the case in which the process is returned to the normal printing movement after the state [5] will be explained.

As indicated in the states from [5] to [6], the printing medium P is fed by a half length of the part "a" of the nozzle row Bk (i.e., by a length of a/2). Then, the printing head H is moved in the direction of the arrow X2 while ejecting color inks from the lower half portion "d" of each of nozzle rows C2, M2, and Y2 onto the area f4 of the printing medium P depending on the printing image to complete the formation of a multi-color image on that area f4. At this time, black ink is ejected from the part "g" of the nozzle row Bk onto the next area f6 of the printing medium P depending on the printing image, so that an image can be printed on that area f6. After that, as indicated in the state [7], the printing medium P is fed by a half length of the part "a" of the nozzle row Bk (i.e., by a length of a/2). Then, the printing head H is moved in the direction of the arrow X1 while ejecting color inks from the part "d" of each of nozzle rows C1, M1, and Y1 onto the area f5 of the printing medium P depending on the printing image to complete the formation of a multi-color image on that area f5. At this time, just as in the case with the normal printing movement, black ink is ejected from the part "a" of the nozzle row Bk onto the next area f7 of the printing medium P depending on the printing image, so that an image can be printed on that area f7.

At this time, consequently, a multi-color image is completely printed on the last area f5 on which the image of black ink is previously printed using the part "c" of the nozzle row. Subsequently, the amount of paper feed is changed, as indicated in the state [8], so that the printing medium P can be fed by the length of the part "a" of the nozzle row Bk just as in the case with the normal movement. Then, just as in the case with the normal movement, the printing head H is moved in the direction of the arrow X2 while ejecting color inks from the part "b" of each of nozzle rows C2, M2, and Y2 onto the area f6 of the printing medium P depending on the printing image to complete the formation of a multi-color image on that area f6. At this time, black ink is ejected from the part "a" of the nozzle row Bk depending on the printing image to print an image on the next area f8 of the printing medium P.

Consequently, it is shifted to the normal printing movement, followed by repeating the normal printing movement using the part "a" of the nozzle row Bk and the part "b" of each of the nozzles C1, C2, M1, M2, Y1, and Y2 with the paper feed by the length of the part "a" of the nozzle row Bk.

(Third Preferred Embodiment)

Figure 6:
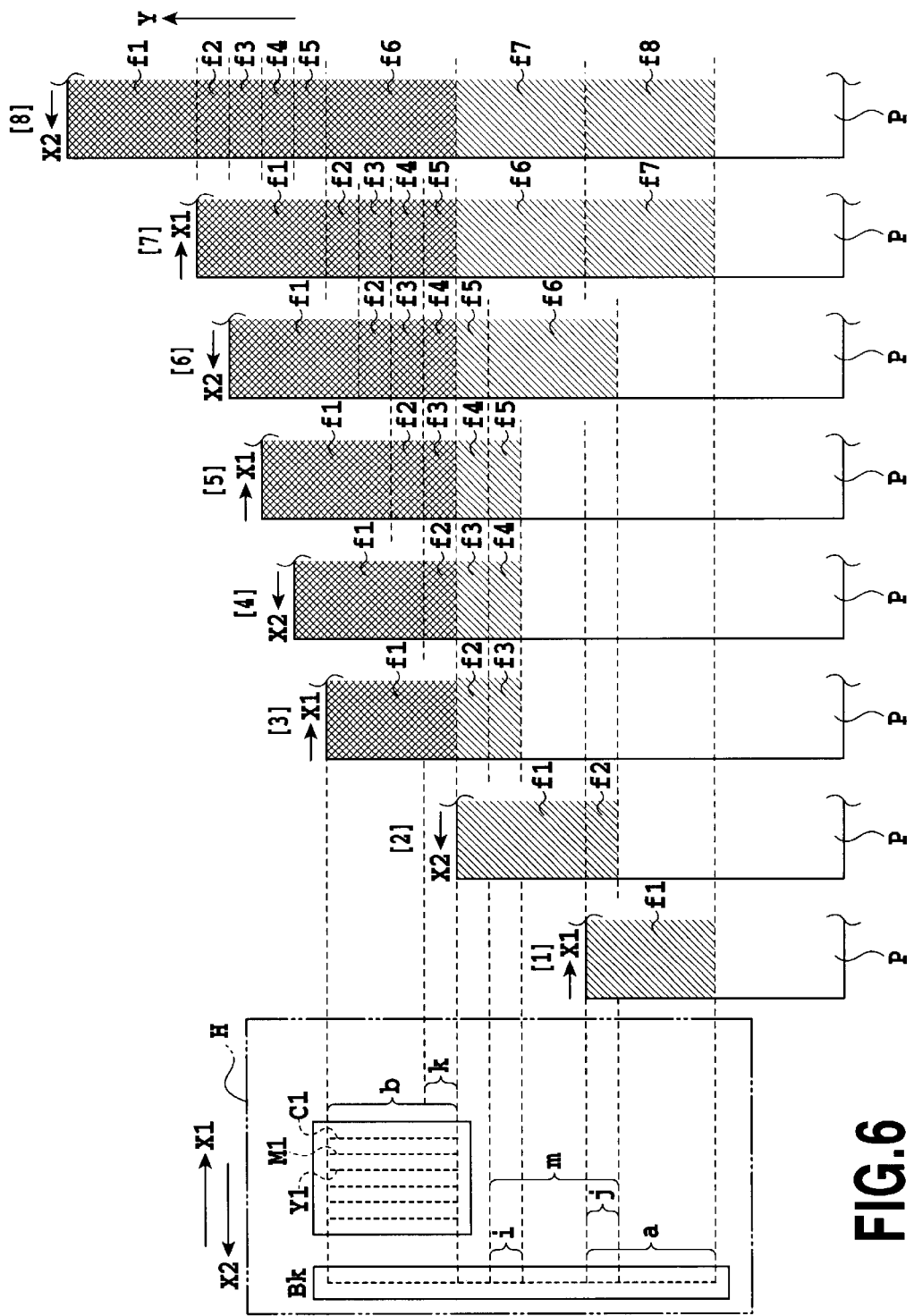
FIG. 6 is an explanation view for illustrating the printing movement in the third preferred embodiment of the present invention.

FIG. 6 is a schematic diagram for illustrating a third preferred embodiment of the present invention. In this embodiment, a printing head H on which a plurality of nozzle rows are arranged just as in the case with the second embodiment described above is used. If there is a need to restrict the number of nozzles to be used in the printing, in this embodiment, the number of nozzles to be used in the printing is restricted to a quarter of the number of nozzles to be used in the normal printing movement for a multi-color image. In the nozzle row Bk, the length of each of the parts "i" and "j" is set to a quarter length of the part "a", while the part "m" is a portion including the parts "i" and "j". The length of the part "m" is equal to that of part "a" (i.e., m=a). Moreover, in each of the nozzle rows C1, C2, M1, M2, Y1, and Y2, the part "k" is set to a quarter length of the part "a". In the case of printing a multi-color image by the normal printing movement, the same process as that of FIG. 4 described above is performed.

In the printing movement shown in FIG. 6, the number of nozzles to be used in the printing is restricted to a quarter of the number of nozzles for the normal printing movement while keeping the same printing conditions as those of the normal printing conditions.

In the state [1], at first, the printing head H is moved in the direction of the arrow X1 while ejecting black ink from the part "a" of the nozzle row Bk onto the area f1 of the printing medium P depending on the printing image to print an image on that area f1. After that, as indicated in the state [2], the printing medium P is fed by the length of the part "a" of the nozzle row Bk. From this point in time, the control for restricting the number of nozzles is initiated. For keeping the same printing conditions as those of the normal printing movement, for the area f1, the printing of an image using color inks should be performed by the subsequent printing movement after the state [2]. Therefore, both the amount of paper feed just after the state [2] and the number of nozzles of each of the nozzle rows C1, C2, M1, M2, Y1, and Y2 to be used in the printing cannot be restricted.

Hence, in the state [2], the printing head H is moved in the direction of the arrow X2 while ejecting black ink only from the part "j" of the nozzle row Bk onto the area f2 on the printing medium P depending on the printing image to print an image on that area f2. As indicated in the state [3], subsequently, the printing medium P is fed by the length of the part "a" of the nozzle row Bk. Then, the printing head H is moved in the direction of the arrow X1 while ejecting color inks from the part "b" of each of nozzle rows C1, M1, and Y1 onto the area f1 of the printing medium P depending on the printing image to complete the formation of a multi-color image on that area f1. At this time, black ink is ejected from the part "i" of the nozzle row Bk onto the next area f3 of the printing medium P depending on the printing image, so that an image can be printed on that area f3.

At this time, consequently, a multi-color image is completely printed on the area f1 on which the image of black ink is previously printed in the state [1], i.e., by the same way as that of the normal printing movement in the state [1]. Subsequently, the amount of paper feed is changed, as indicated in the state [4], so that the printing medium P can be fed by a quarter length of the part "a" of the nozzle row Bk (i.e., by a length of a/4). Then, the printing head H is moved in the direction of the arrow X2 while ejecting color inks from the part "k" of each of nozzle rows C2, M2, and Y2 onto the area f2 of the printing medium P depending on the printing image to complete the formation of a multi-color image on that area f2. At this time, black ink is ejected from the part "i" of the nozzle row Bk depending on the printing image to print an image on the next area f4 of the printing medium P. As indicated in the state [5], subsequently, the printing medium P is fed by a quarter length of the part "a" of the nozzle row Bk (i.e., by a length of a/4). Then, the printing head H is moved in the direction of the arrow X1 while ejecting color inks from the part "k" of each of nozzle rows C1, M1, and Y1 onto the area f3 of the printing medium P depending on the printing image to complete the formation of a multi-color image on that area f3. At this time, black ink is ejected from the part "i" of the nozzle row Bk depending on the printing image to print an image on the next area f5 of the printing medium P.

Consequently, it is shifted to the printing movement in which the number of nozzles to be used in the printing is restricted, followed by repeating the printing movement using the part "i" of the nozzle row Bk and the part "k" of each of the nozzles C1, C2, M1, M2, Y1, and Y2 with the paper feed by a quarter of the length of the part "a" (i.e., a/4) of the nozzle row Bk. Therefore, the same printing conditions as those of the normal printing movement can be maintained.

Next, the case in which the process is returned to the normal printing movement by removing the restriction on the number of nozzles to be used in the printing will be explained. In other words, here, the case in which the process is returned to the normal printing movement after the state [5] will be explained.

As indicated in the states from [5] to [6], at first, the printing medium P is fed only by a quarter length of the part "a" of the nozzle row Bk (i.e., by a length of a/4). Then, the printing head H is moved in the direction of the arrow X2 while ejecting color inks from the part "k" of each of nozzle rows C2, M2, and Y2 onto the area f4 of the printing medium P depending on the printing image to complete the formation of a multi-color image on that area f4. At this time, black ink is ejected from the part "m" of the nozzle row Bk onto the next area f6 of the printing medium P depending on the printing image, so that an image can be printed on that area f6. After that, as indicated in the state [7], the printing medium P is fed by a quarter of the part "a" of the nozzle row Bk (i.e., by a length of a/4). Then, the printing head H is moved in the direction of the arrow X1 while ejecting color inks from the part "k" of each of nozzle rows C1, M1, and Y1 onto the area f5 of the printing medium P depending on the printing image to complete the formation of a multi-color image on that area f5. At this time, just as in the case with the normal printing movement, black ink is ejected from the part "a" of the nozzle row Bk onto the next area f7 of the printing medium P depending on the printing image, so that an image can be printed on that area f7.

At this time, consequently, a multi-color image is completely printed on the last area f5 on which the image of black ink is previously printed using the part "i" of the nozzle row Bk. Subsequently, the amount of paper feed is changed, as indicated in the state [8], so that the printing medium P can be moved by the length of the part "a" of the nozzle row Bk. Then, just as in the case with the normal movement, the printing head H is moved in the direction of the arrow X2 while ejecting color inks from the lower portion "b" of each of nozzle rows C2, M2, and Y2 onto the area f6 of the printing medium P depending on the printing image to complete the formation of a multi-color image on that area f6. At this time, black ink is ejected from the part "a" of the nozzle row Bk depending on the printing image to print an image on the next area f8 of the printing medium P.

Consequently, it is shifted to the normal printing movement, followed by repeating the normal printing movement using the part "a" of the nozzle row Bk and the part "b" of each of the nozzles C1, C2, M1, M2, Y1, and Y2 with the paper feed by the length of the part "a" of the nozzle row Bk.

(Other Embodiments)

In the above preferred embodiments, the printing is performed using a specific nozzle row (Bk) on an area of the printing medium at first (hereinafter, referred to as a preliminary printing) and the next printing is then performed using other nozzles (C1, C2, M1, M2, Y1 and Y2) on the same area thereof (hereinafter, referred to as a subsequent printing). In that case, regardless of the change in the number of nozzles to be used in the printing of an image, the same printing conditions as those of the normal printing movement can be maintained. In other words, in the case of the first preferred embodiment, regardless of the change in the number of nozzles to be used in the printing of an image, the subsequent printing is performed on the area printed by the preliminary printing at the next printing scan of the printing head. In the case of the second or third preferred embodiment, regardless of the number of nozzles to be used in the printing of an image, the next printing scan of the printing head does not perform the subsequent printing on the area printed by the preliminary printing (hereinafter, referred to as an idle printing scan). Subsequently, at the time of performing the printing scan by the printing head, the subsequent printing is performed. The idle printing scans may be performed twice two or more times. Consequently, by keeping the same printing conditions as those of the normal printing movement, regardless of the number of nozzles to be used in the printing of an image, a high speed printing of an image can be performed without changing the ink color which comes out on the printing medium.

In the present invention, however, it is not limited to the configuration of the printing head as used in each of the above preferred embodiments, i.e., in which the nozzle row Bk for black ink and the nozzle rows C1, C2, M1, M2, Y1, and Y2 for their respective color inks are arranged and displaced in the sub-scan direction. Alternatively, the printing head is allowed to be constructed such that a plurality of nozzles is arranged and displaced in the sub-scan direction. The application of the present invention allows a printing at a speed as high as possible without changing the property of ink color.

In the present invention, furthermore, the sequence of ink-placing (ink-supplying) as described in the above embodiments is not limited to a specific sequence, e.g., the sequence thereof in which black ink is placed at first and color inks are then placed. For instance, therefore, black ink may be placed after previously placing color inks on the printing medium.

In the present invention, it is not limited to the bi-directional printing system, it is also possible to apply the one-way printing system in which the printing head is limited to perform the printing movement only in the one-way transmission. Therefore, a printing head having either of nozzle rows Y1, M1 and C1 and nozzle rows Y2, M2 and C2 to be used as nozzle rows for ejecting color inks may be provided to print a multi-color image on a printing medium by means of the one-way printing system.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. An ink-jet printing apparatus using a printing head having a plurality of nozzle rows, each with an arrangement of nozzles for ejecting ink, to print an image on a printing medium by repeating the steps of ejecting ink from the nozzle rows of the printing head onto the printing medium while moving the printing head in a main-scan direction and transferring the printing medium in a sub-scan direction perpendicular to the main-scan direction, wherein at least one of the plurality of the nozzle rows of the printing head is arranged at a position displaced from other nozzle rows in the sub-scan direction, said ink-jet printing apparatus comprising:

changing means capable of changing the amount of transferring of the printing medium; and control means for changing the number of nozzles to be used in the printing, which nozzles belong to the nozzle row located at an upstream side in the sub-scan direction, before changing the amount of transferring of the printing medium by said changing means, and changing the number of nozzles to be used in the printing, which nozzles belong to the nozzle row located at a downstream side in the sub-scan direction, after changing the amount of transferring of the printing medium by said changing means.

2. An ink-jet printing apparatus as claimed in claim 1, wherein the nozzle row located at the downstream side is located at a position that allows the nozzle row located at the downstream side to eject ink on a predetermined area of the printing medium after performing at least one transfer movement of the printing medium following the ink ejection from the nozzle row located at the upstream side.

3. An ink-jet printing apparatus as claimed in claim 1, wherein said control means performs the ink ejection from the nozzle row located at the downstream side onto a printing area of the printing medium on which ink is already ejected from the nozzle row located at the upstream side before the change in the amount of transferring of the printing medium by said changing means.

4. An ink-jet printing apparatus as claimed in claim 1, wherein said changing means is capable of changing the amount of transferring of the printing medium to a predetermined normal amount thereof when the amount of transferring of the printing medium has been changed to an amount less than the predetermined normal amount.

5. An ink-jet printing apparatus as claimed in claim 1, wherein the printing head has a nozzle row capable of ejecting black ink displaced from nozzle rows capable of ejecting other color inks in the sub-scan direction.

6. An ink-jet printing apparatus as claimed in claim 1, wherein said control means restricts the length of each of the nozzle rows to be used in the printing, depending on the number of nozzles to be used in the printing.

7. An ink-jet printing apparatus as claimed in claim 1, wherein said changing means and said control means adjust the amount of transferring of the printing medium and the number of nozzles to be used in the printing, respectively, on the basis of information regarding a printing status.

8. An ink-jet printing apparatus as claimed in claim 1, wherein said changing means and said control means adjust the amount of transferring of the printing medium and the number of nozzles to be used in the printing, respectively, on the basis of information regarding an image to be printed on the printing medium.

9. An ink-jet printing apparatus as claimed in claim 1, wherein said changing means and said control means adjust the amount of transferring of the printing medium and the number of nozzles to be used in the printing, respectively, on the basis of information regarding a printing position of the printing medium on which an image is to be printed.

10. An ink-jet printing apparatus as claimed in claim 1, wherein said changing means and said control means adjust the amount of transferring of the printing medium and the number of nozzles to be used in the printing, respectively, during a period of printing an image on a page of the printing medium.

11. An ink-jet printing apparatus as claimed in claim 1, wherein the printing head comprises a plurality of electro-thermal transducer elements that generate energies for ejecting ink.

12. An ink-jet printing method using a printing head having a plurality of nozzle rows, each with an arrangement of nozzles for ejecting ink, to print an image on a printing medium by repeating the steps of ejecting ink from the nozzle rows of the printing head onto the printing medium while moving the printing head in a main-scan direction and transferring the printing medium in a sub-scan direction perpendicular to the main-scan direction, wherein at least one of the plurality of the nozzle rows of the printing head is arranged at a position displaced from other nozzle rows in the sub-scan direction, said ink-jet printing method comprising the steps of:

in a process of moving the printing head in the main-scan direction before changing the amount of transferring of the printing medium, changing the number of nozzles to be used in the printing, which nozzles belong to the nozzle row located at an upstream side in the sub-scan direction, followed by performing printing;

changing the amount of transferring of the printing medium, and then transferring the printing medium by the changed amount; and in the process of moving the printing head in the main-scan direction after the step of transferring of the printing medium by the changed amount, changing the number of nozzles to be used in the printing, which nozzles belong to the nozzle row located at a downstream side in the sub-scan direction, followed by performing printing.

13. An ink-jet printing apparatus as claimed in claim 1, wherein said control means decreases the number of nozzles to be used in the printing, which nozzles belong to the nozzle row located at the upstream side in the sub-scan direction, in a printing process before decreasing the amount of transferring of the printing medium by said changing means, and decreases the number of nozzles to be used in the printing, which nozzles belong to the nozzle row located at the downstream side in the sub-scan direction, in a printing process after decreasing the amount of transferring of the printing medium by said changing means.

14. An ink-jet printing apparatus as claimed in claim 1, wherein said control means increases the number of nozzles to be used in the printing, which nozzles belong to the nozzle row located at the upstream side in the sub-scan direction, in a printing process before increasing the amount of transferring of the printing medium by said changing means, and increases the number of nozzles to be used in the printing, which nozzles belong to the nozzle row located at the downstream side in the sub-scan direction, in a printing process after increasing the amount of transferring of the printing medium by said changing means.

15. An ink-jet printing method as claimed in claim 12, wherein in the process of moving the printing head in the main-scan direction before decreasing the amount of transferring of the printing medium, printing is performed after decreasing the number of nozzles to be used in the printing, which nozzles belong to the nozzle row located at the upstream side in the sub-scan direction, and in the process of moving the printing head in the main-scan direction after decreasing the amount of transferring of the printing medium, printing is performed after decreasing the number of nozzles to be used in the printing, which nozzles belong to the nozzle row located at the downstream side in the sub-scan direction.

16. An ink-jet printing method as claimed in claim 12, wherein in the process of moving the printing head in the main-scan direction before increasing the amount of transferring of the printing medium, printing is performed after increasing the number of nozzles to be used in the printing, which nozzles belong to the nozzle row located on the upstream side in the sub-scan direction, and in the process of moving the printing head in the main-scan direction after increasing the amount of transferring of the printing medium, printing is performed after increasing the number of nozzles to be used in the printing, which nozzles belong to the nozzle row located at the downstream side in the sub-scan direction.

* * * * *